United States Patent
Gallagher et al.

(10) Patent No.: US 12,229,251 B2
(45) Date of Patent: Feb. 18, 2025

(54) SHIM BASED SECURE MODULE ACCESS

(71) Applicant: Red Hat, Inc., Raleigh, NC (US)

(72) Inventors: Brian Gallagher, Waterford (IE); Cathal O'Connor, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 146 days.

(21) Appl. No.: 18/083,324

(22) Filed: Dec. 16, 2022

(65) Prior Publication Data
US 2024/0202319 A1 Jun. 20, 2024

(51) Int. Cl.
*G06F 21/54* (2013.01)
*G06F 21/57* (2013.01)
*G06F 21/60* (2013.01)

(52) U.S. Cl.
CPC .............. *G06F 21/54* (2013.01); *G06F 21/57* (2013.01); *G06F 21/604* (2013.01)

(58) Field of Classification Search
CPC ......... G06F 21/54; G06F 21/57; G06F 21/604
See application file for complete search history.

(56) References Cited

U.S. PATENT DOCUMENTS

| | | | |
|---|---|---|---|
| 7,640,429 B2 | 12/2009 | Huang et al. | |
| 8,117,643 B2 | 2/2012 | Vidya et al. | |
| 11,445,035 B2 | 9/2022 | Duggal et al. | |
| 11,650,810 B1 * | 5/2023 | Wang | G06F 8/73 717/148 |
| 2012/0131646 A1 | 5/2012 | Chandolu et al. | |
| 2013/0205415 A1 * | 8/2013 | McKEE | G06F 8/24 717/165 |
| 2017/0012846 A1 * | 1/2017 | Chen | H04L 43/0876 |
| 2018/0007178 A1 | 1/2018 | Subhraveti | |
| 2020/0042720 A1 | 2/2020 | Rebelo | |
| 2020/0082095 A1 * | 3/2020 | Mcallister | G06F 11/323 |
| 2022/0103593 A1 * | 3/2022 | Singh | H04L 63/0245 |
| 2023/0367565 A1 * | 11/2023 | O'Connor | G06F 21/53 |
| 2024/0103818 A1 * | 3/2024 | Gallagher | G06F 21/44 |
| 2024/0127148 A1 * | 4/2024 | Barcziova | G06F 9/5005 |

FOREIGN PATENT DOCUMENTS

| | | |
|---|---|---|
| CN | 112765639 A | 5/2021 |
| CN | 114450685 A | 5/2022 |

* cited by examiner

*Primary Examiner* — Michael R Vaughan
(74) *Attorney, Agent, or Firm* — Kilpatrick Townsend & Stockton LLP

(57) ABSTRACT

Systems and methods comprising at least one node comprising an application container; a container image associated with the application container; a static analyzer module deployed to analyze the container image, with instructions configured to autonomously parse, code of an application, during compile time of the application, wherein the application is to be deployed in the application container; determine, based on the parsing, for at least one section of the code, at least one module necessary for execution of the at least one section; annotate, the at least one section of the code, based on the determined at least one module; and inject, at least one wrapper around the at least one section of the code, wherein the wrapper adds at least one restriction to an execution of the at least one section at runtime, wherein the restrictions are based on at least one condition.

20 Claims, 5 Drawing Sheets

SHIM BASED SECURE MODULE ACCESS

BACKGROUND

Computer systems may run applications or services that are provided via a server or cloud. The applications or services can be developed, compiled and then deployed at runtime. Application instances or services may run within application containers ("container(s)"), which may be run on physical or virtual machines on distributed or cloud based systems. Containers are associated to a container image which includes all the programs, modules and structures required to run a container with the applications installed within it, these container images may pose security risks and present a surface for attacks by malicious actors.

SUMMARY

The present disclosure provides new and innovative systems and methods for minimizing potential attack surfaces in application containers. In one example a system comprises at least one node comprising an application container; a container image associated with the application container; a static analyzer module deployed to analyze the container image, with instructions configured to autonomously parse, code of an application, during compile time of the application, wherein the application is to be deployed in the application container; determine, based on the parsing, for at least one section of the code, at least one module necessary for execution of the at least one section; annotate, the at least one section of the code, based on the determined at least one module; and inject, at least one wrapper around the at least one section of the code, wherein the wrapper adds at least one restriction to an execution of the at least one section at runtime, wherein the restrictions are based on at least one condition.

In one example a method is disclosed that comprises parsing, code of an application, during compile time of the application, wherein the application is to be deployed in the application container; determining, based on the parsing, for at least one section of the code, at least one module necessary for execution of the at least one section; annotating, the at least one section of the code, based on the determined at least one module; and injecting, at least one wrapper around the at least one section of the code, wherein the wrapper adds at least one restriction to an execution of the at least one section at runtime, wherein the restrictions are based on at least one condition.

In an example a non-transitory machine readable medium storing code, is disclosed, which when executed by a processor is configured to parse, code of an application, during compile time of the application, wherein the application is to be deployed in the application container; determine, based on the parsing, for at least one section of the code, at least one module necessary for execution of the at least one section; determine, for the at least one module, at least one operating system module necessary for execution of the module; annotate, the at least one section of the code, based on the determined at least one module; and inject, at least one wrapper around the at least one section of the code, wherein the wrapper adds at least one restriction to an execution of the at least one section at runtime, wherein the restrictions are based on at least one condition.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION

Figure 1:
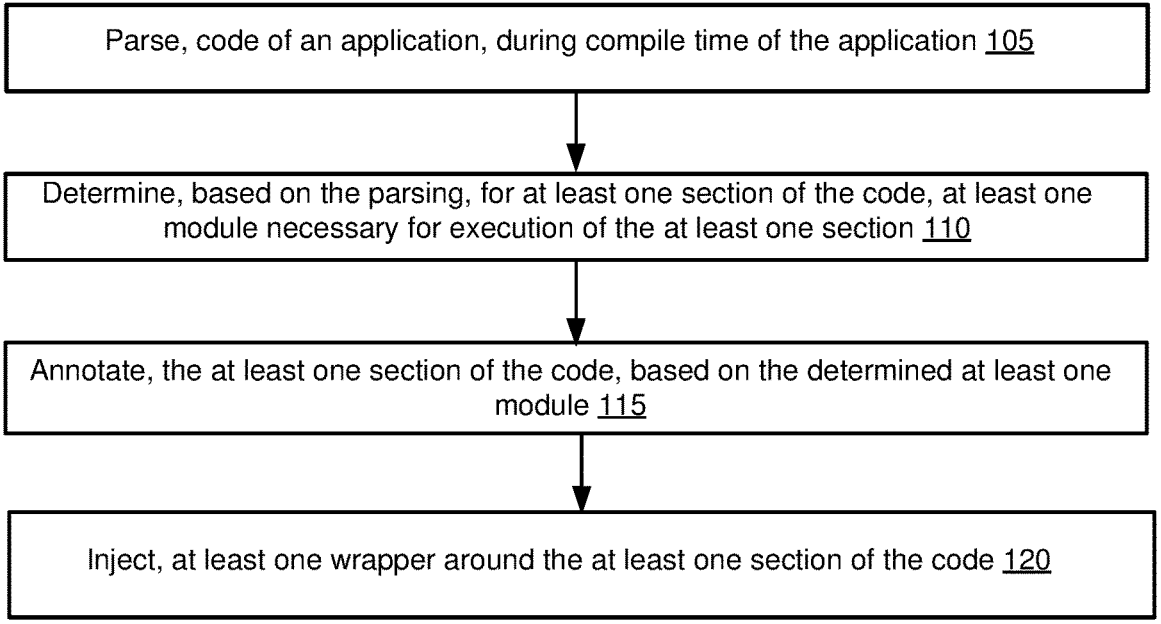
FIG. 1 illustrates a method to autonomously restrict access to various parts of a container image, according to at least one aspect of the present disclosure.

Techniques are disclosed herein for reducing the attack surface of an application container. Application containers are essential in distributed systems and cloud-based systems. Containers may run one or more applications in isolation, and independently from other containers that may be hosted across one or more nodes, while still able to communicate with other nodes and containers. While this distributed setup provides various benefits such as modularity and removing any single or individual point of failure in a system, it also presents several problems.

A container image (also referred to herein as "image") is a base file with executable code that acts as the map to build and execute a container and is an essential part of distributed systems. The image or container image defines a container and how it runs, and is built up in various layers. The first layer of an image is generally a root operating system ("OS") or a base OS layer, for example Ubuntu. On top of the base OS layer is generally an application layer such as a Node JS or Java application. Therefore, image containers provide the core components and modules that are necessary to generate a container, for example the modules for the operating system layer (also referred to herein as "base layer", "OS layer", or "base OS layer"/"OS base layer") that the container will be based on or run on, as well as any application layers that may be built on top of this base OS layer.

One problem that containers and container images face is that they generally contain more files and modules than necessary to run the applications or undertake the functions they are designed to execute. These unnecessary files and modules create firstly, storage problems, slowing down bandwidth, downloading, copying, and transfer of containers and applications between devices, nodes, or execution environments. Secondly, the unnecessary size of these containers creates an attack surface targetable by malicious actors. The bigger the size of a container image, correlating to the number of modules or packages installed in the image, the larger the attack surface of that container, since a larger number of modules need to be constantly monitored, and updated, to fend off new and emerging threats and vulnerabilities.

In general, the base OS layer, is usually a first generic base image layer which may have thousands of unnecessary modules that are not used for the application(s) in an application layer of the image, and run in a container. Each application may only need 10-50 modules as an example, whereas a generic base OS layer may contain thousands of OS modules, most of which are unrelated to the application(s) in the container. In some aspects of the present disclosure the base OS layer is stripped down to only contain the modules necessary for the running of the application or application layer running on the base OS layer in the container. In some aspects, access to the base layer OS modules by the application layer and its application modules is restricted based on conditions. These embodiments reduce the attack surface of container images during runtime and reduce the overall size of the container.

In various aspects, access to a base layer or an OS module is restricted by default, and the restriction is implemented or enforced by a SHIM layer. In these aspects conditions can be set by an analyzer module and/or an optional code injector module, to determine and set conditions that remove default access restrictions to OS modules or layers during runtime. These conditions may be therefore set to allow access or communication between the base OS layer and its modules and the application layer and its modules, and/or the conditions may also be placed to add the restrictions to the code as well as add conditions removing the access restrictions (all these various types of conditions are hereinafter collectively referred to as "conditions" or "access conditions", which may refer to single or multiple conditions).

FIG. 1 illustrates a method to autonomously restrict access to various parts of a container image, according to at least one aspect of the present disclosure. Method 100 may be undertaken on computing devices or systems, for example systems 3000, 4000, FIG. 4-5. Method 100 may comprise parsing 105 a code of an application, during compile time of the application. This may be done in an application container, or on another instance or environment, but it is undertaken on code of an application that will be deployed in the container. The parsing 105 can in some embodiments be undertaken by an analyzer module that is programmed or configured to autonomously undertake some or all the processes in method 100 depending on the embodiment.

The parsing could be undertaken on the code line by line, or it could be undertaken on specific portions, sections, or segments of the code. In several aspects, the parsing may identify a line as a part of a specific section, such as a function, and then determine a start and/or end of the function and then parse the function independently. It may then repeat this process across the full code. In several aspects, a section as identified herein may refer to a function. In various aspects, a section can refer to a "section" in the general sense, for example, as a general segment of the code, definable in any way. The parsing could be used to identify variables, functions, comments, classes, or other forms of definitions in the code.

In various aspects, method 100 determines, based on the parsing conducted, for at least one section of the code, at least one module necessary for execution of the at least one section. The at least one module in several aspects is a module of the application or custom application residing in a top layer or application layer of the container image. In other aspects the at least one module may comprise an operating system module ("OS module"), the OS module may in several aspects reside in the base OS layer. In several aspects the at least one module may include both an application module that resides in the application layer in the container image, as well as a base layer or OS module that may reside in the OS base layer. This application module and OS module may be dependent upon each other, for example where one calls, utilizes, accesses or relies on the libraries or functions of the other. In several aspects method 100 may separately determine for each module, at least one operating system module necessary for execution of the module. So for example, in several aspects, the method 100 may first determine 110 an application level module, or application module, and then determine the dependencies of that application module, for example the libraries or modules in the base OS layer, or OS modules that the application or application module will rely on. For example a security application may rely on the libraries of Open SSL in the Ubuntu or OS layer or an underlying RPM or package.

In various aspects, the frequency of those dependencies, or the time or state that the application must be in, to request, call, access, require, or use the base OS module are also determined. In several aspects the OS module is necessary for the execution of the section, function, or the application module, or in other aspects it is only required by the section, function, or application module at specific times, and states.

In numerous aspects, the determining of an application module, or OS module(s), includes determining conditions or dependencies between them, including times, states, or user access conditions. In several aspects, the determining 110 is limited to determining what application module is necessary for a function or a section of code to run. In some aspects the determining 110 may also include determining what OS module(s) is required by the function, section, or by the application module in the section, or function of the code that is parsed 105. In some aspects determining the OS module required may be a separate process to determining 110. In numerous aspects, the determining 110 may also include determining conditions associated with the function, section, the application module(s), application, or application layer, calling, accessing, or requiring the OS module(s) or OS base layer. These conditions may be related to time, state, user conditions or a combination thereof.

In several aspects, the method 100 may include restricting, by default, all access to all underlying OS modules, or the base OS layer, by the application, functions, sections, or the application modules. These restrictions may include delays of access, partially restricted access, or absolute prevention of any access. Access may include calls, or interactions between the OS modules, or the base OS layer and application, functions, sections, or the application modules. These restrictions may then be removed only upon or based on the conditions that are related to time, state, or user privileges or a combination thereof.

In several aspects method 100 may include either as part of parsing 105, determining 110, or as part of a separate process, creating a list that includes condition data and information on the conditions to govern access between the base layer and application layer are restricted and/or allowed. These conditions are based on dependencies, times, states, users, or associations between any of the application, function, section, application module(s), OS module(s), or base OS layer. The list may be stored in one or more databases, nodes, device, virtual spaces, and may in some aspects, be used to generate or determine discernible patterns over time, especially if the list is a central list where information from various containers across nodes in a distributed system are pulled or received. This mass collected data, allows determining conditions based on the patterns to allow interaction, calls, or access between application modules and OS modules, or between application layers and OS base layers.

These historical data, information, or determined patterns may be used to derive conditions, dependencies, or other relevant information, such as time-based relationships, states, user privileges and permissions, frequency of one module accessing another and the like, based not only on the static analysis conducted, and determining dependencies between layers and modules, when parsing the code of an application; but based on the historical data collected, for example from generated lists as described, or from other databases or known dependencies, or administrator domain knowledge that is manually added to the historical data about these conditions.

One example of historical patterns being used to generate access conditions, may include an application that is run a hundred times, then it may be determined from those runs, that a function may only be called a certain number of times during a specific period, or called only during specific conditions being met, such as a function being called only on startup, or a security function that conducts a scan once a week at most. Therefore in various aspects, a condition for a module, such as an application module, or an OS module being activated, triggered, accessed, or called, where access may be allowed (or restricted) may be determined. This condition may be based on time, states, or users, including and not limited to the state of a device, a user, or an application, or permissions of a user or groups of users, for example only staff in the IT team may access certain functionalities of an application that utilizes certain application modules and OS modules. These conditions are important in the annotation 115 of the code in method 100.

In numerous aspects, identifying, deriving, or determining of conditions is based on a static analysis of the code of the application that for example, can determine that a function only gets called a certain number of times, during a specified period, or in some aspects, potentially during the lifetime of the application. But in various other aspects, the calling of functions may be based on a dynamic variables only available at runtime, so in these cases, conditions may be identified, derived, or determined, that by default not allow access to any base OS layer, or OS module, but will allow access to an OS module, or OS base layer, whenever a function is called, but does not impose any other conditions to restrict access or communications between the layers or modules, such as conditions based on times, states or users.

In situations, where functions rely on dynamic variables, further restrictions may be added to accessing the OS module or base OS layer if there is some other data, including pattern data or specific historical data that may be used to determine conditions associated with the section of the code or the relevant function of the application. This pattern or historical data may be historical or pattern data that is stored in a rules database or a list. In numerous aspects, whether determining conditions for static or dynamic restrictions, conditions can be determined based on historical data and patterns. Conditions may also be added manually by a user or administrator of the system.

In numerous aspects, method 100 may also include annotating 115, the at least one section of the code, based on the determined at least one module. In several aspects, the annotating may be based on the dependencies, or conditions that are determined 110, derived, or identified during other processes of method 100. For example, if the static analyzer module has determined 110, or determined during other processes as part of method 100, or as described herein, that an application module relies on a specific OS module, but that it is determined that for example this call from the application module to the OS module only needs to occur during a specific state or condition, for example a decryption on a specific file or file type, or the call being initiated to the OS module or during a specific time period, or during a device or user state, for example during start up, or during a security scan of a system, then the annotation will mark the functions or sections of the code related to these function or process calls, with the associated conditions or restrictions to be added to them, at the next injection 120 stage. Annotating 115 can include marking a function, or at least a portion of a function. In several aspects, annotating 115 includes annotating a section that may include one or more functions of the application.

Finally, method 100 may include injecting 120, at least one wrapper around the at least one section of the code. The injection may be around the annotated section of the code. The wrapper may be injected 120 by the static analyzer module, or in alternative embodiments, separately by a code injector module. Both the static analyzer module and the code injector module may be hosted on the same node, execution environment, or in some aspects in different ones. The injecting 120 can occur at the end of compile time when the code is finalized, and adds new code to the application code, or the functions parsed 105 in method 100.

By default, in most current technologies, application layers and modules have access to a base OS layer, and its various modules, therefore the wrapper(s) add restrictions to either the whole application or its code, or to sections in the code depending on the embodiment. The restrictions restrict access to the base OS layer and its OS modules by the application layer, and the application modules and the functions that depend on the OS and its modules. These conditions may set the necessary states, times, and users where the restriction is enforced or where it is removed. The conditions may be relevant to compile time setting of restriction, as well as the runtime enforcement and management of the access restrictions.

In various aspects, the restrictions are not a total barring of access or calls but a reduction of access between the application layer and its application modules, and the base OS layer and its OS modules. These conditions determined, identified, or derived in method 100, may remove a restriction to access the specific OS module that was determined 110, or in a separate process, to be necessary for the execution of a function, application module, or specific sections of the code. The conditions may remove access for a certain time period, or when the application is at a certain state, or to specific user(s), or a combination thereof. Restrictions placed may include complete barring of access or calls between the application and the base OS layer, delays between the two, or restrictions only during certain conditions or time periods. In some embodiments a wrapper is placed around the full code or application to bar all access to the base OS layer and its modules, and then the wrapper injects specific conditions, that can be comprised of code and programming language, around specific sections of codes, such as function(s), to allow access to the base OS layer and its modules when the condition(s) are met at runtime. One or more conditions may be wrapped around each section.

Figure 2:
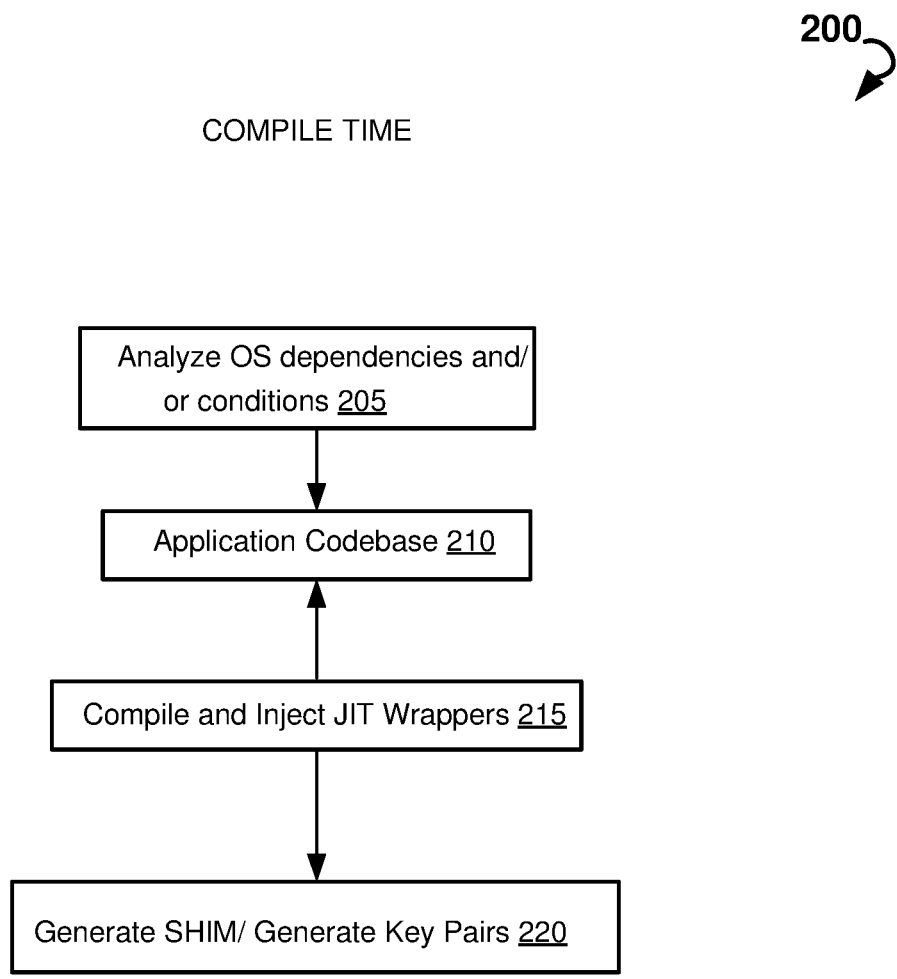
FIG. 2 illustrates a method of compile time code analysis and injection to restrict run-time access to modules, according to at least one aspect of the present disclosure.

FIG. 2 illustrates a method of compile time code analysis and injection to restrict run-time access to modules, according to at least one aspect of the present disclosure. Method 200 is executed during compile time, and may similar to method 100, FIG. 1, utilize a static analyzer module independently or in combination with a code injector module to undertake one or more of the processes of method 200. Method 200 may commence by analyzing 205 the operating system dependencies and/or conditions of an application's codebase 210. This analysis may be done line by line, or it may be done based on section by section. Once the codebase 210 is analyzed by a static analyzer module for example, similar to the processes described in method 100, then the application may be compiled, and wrappers are injected 215 around the analyzed application, to wrap determined, or identified sections, or functions with code to restrict and/or allow access by the application, functions, or application modules, to specific OS modules and/or the OS base layer at runtime. Multiple restrictions may be added by one wrapper, for example a wrapper may state: allow function execution if: totalExecutions<=2 && preventDBCreation!=false & & currentTime==weekend, the wrapper here only allows a function to execute if the total function executions are currently at or under 2, and if the state is not set to prevent database creation and the current time is the weekend. This function execution is controlled by three variables where totalExecutions is a numeric value, preventDBCreation is a boolean and currentTime is a dateTime.

Finally, a SHIM layer may be generated 220 to apply or implement the conditions that were wrapped around the sections in the code at runtime. In several aspects of the invention the SHIM layer is placed between the base OS layer and the application layer to manage access to the operating system module, or to implement one or more conditions and the restrictions during runtime. It is the SHIM layer that prevents access, or calls between the application layer and its application modules, and the base OS layer and its OS modules. The SHIM layer also implements any conditions between the application layer and its application modules, and the base OS layer and its OS modules to allow calls or access between the two.

In several embodiments, the SHIM layer is configured to, based on a condition being satisfied, undertake at least one of the following: allowing access, allowing partial access, preventing access, or delaying access to one or more operating system modules in the OS base layer by one or more application modules in the application layer based on the at least one restriction and its associated conditions that were injected 215 as a wrapper around the relevant section of code. In several aspects the OS layer is a stripped down version or a limited version base OS layer, that has been reduced in the number of modules it contains based on determinations made by a module, for example a static analyzer module in a process, for example determining 110, FIG. 1, or analysis 205 of the application and its code. In the stripping down of an OS base layers, determinations or analysis that are conducted, in various aspects while or after parsing of code of one or more applications, may determine what OS modules are necessary to run application modules or functions, and it is only those modules that are added to the base OS layer, while all other modules that are determined to not be necessary for the application(s) in the application layer, may be removed or stripped from the general or generic operating system. This stripping down of an OS layer may occur when building a container or container image, by first determining the applications that will be installed on the application layer, and then the dependencies of these applications, including any OS modules that are necessary, and then based on these determinations and analysis, the base OS layer may be constructed or built with only the relevant or identified OS modules resulting in a smaller OS layer.

Figure 3:
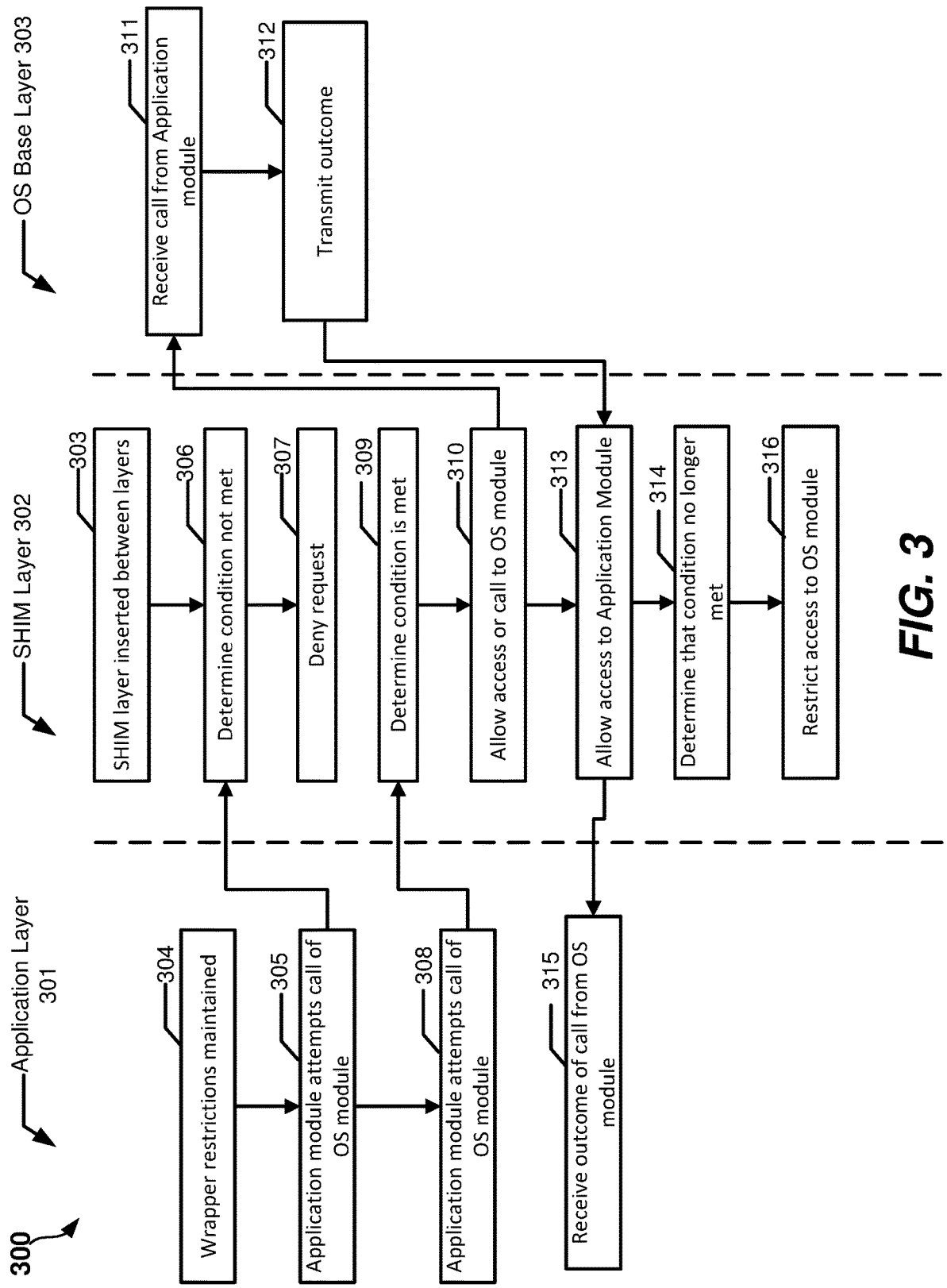
FIG. 3 illustrates a runtime system implementing a SHIM layer to control access to application layer modules and base layer OS modules, according to at least one aspect of the present disclosure.

FIG. 3 illustrates a runtime system implementing a SHIM layer to control access to base layer OS modules, according to at least one aspect of the present disclosure. System 300 is a runtime system for management of the container image. In several aspects, a SHIM layer 302 is inserted 303 at or after compile time of a program, where the program is to be deployed in a container. The SHIM layer 302 may generally be placed in any position relative to the present layers in a container image. In numerous aspects, the image comprises at least three layers, a base OS layer 303, an application layer 301, and a SHIM layer 302 is inserted between them to manage access restrictions and calls to and from each layer to the other. This placement of the SHIM layer 302 is designed to manage access to the operating system modules in the base OS layer 303, by application modules in the application layer of the container image.

At runtime, a function, or section of the code, may require an application module to execute, but injected wrappers and the restrictions they add onto the section of the code are currently in a maintained 304 and therefore the application module cannot directly interact with OS module(s) in the OS base layer 303. In various aspects, the default state the wrappers provide is restricting access or communications between the application layer 301 and the OS base layer 303, and this is enforced by SHIM layer 302. An application module in application layer 301 that a function in the application requires to execute may attempt a call, for example via an RBAC request (role-based access control request), an OS module in the OS base layer 303. The call may be made at a time that the function is not supposed to execute, for example, a malicious actor may have inserted script into the application executing on the container, and the application module is attempting to execute and subsequently execute or call an OS module. Because this call has to go through the inserted SHIM layer 302, the SHIM layer 302 determines 306 that the condition for calling the OS module is not met. For example, the applications is not at a state, e.g., device is at start up, where it is expected to make this call, the SHIM layer examines the injected wrappers around the function and determines that the code shall not execute at this time and denies 307 the call or request to OS base layer 303. The SHIM layer 302 may determine whether a condition is met by verifying the state, time, or user conditions against the created list(s) as discussed herein in FIG. 1-2 and/or against historical data or determined frequency patterns.

The application may then attempt 308 another call, but this time where a condition such as executing at a certain or preset timestamp, is met. This time the SHIM layer 302 determines 309 that the condition is met, since the function and application module are expected to execute at the present time or condition, and allows 310 access or a call to the OS module. The base OS layer 303 receives 311 the call from the application module, processes the call and transmits 312 the outcome through SHIM layer 302. In some embodiments because the condition wrapped around the code requires a call to and from the OS base layer, the condition remains in a state where it is satisfied and allowing communication between the two layers, and therefore the SHIM layer 302 allows transmission of the outcome to the Application layer 301, which receives 315 the outcome of the call from the OS module.

In numerous embodiments, the SHIM layer 302 may nonetheless determine or calculate whether the condition is still met when receiving the outcome or response from the OS module from the OS base layer. The SHIM layer 302 may also receive communications, or requests from OS base layer 303 independently from calls from the application layer 301, and can determine whether a condition in a function or in the application is met to allow a transmission or access between modules in each layer.

Once the SHIM layer 302 determines that the condition is no longer met, for example, because the application module execution is completed, or the function has already completed its execution, then the SHIM layer 302 may once again restrict access between the two layers 301, and 303.

Figure 4:
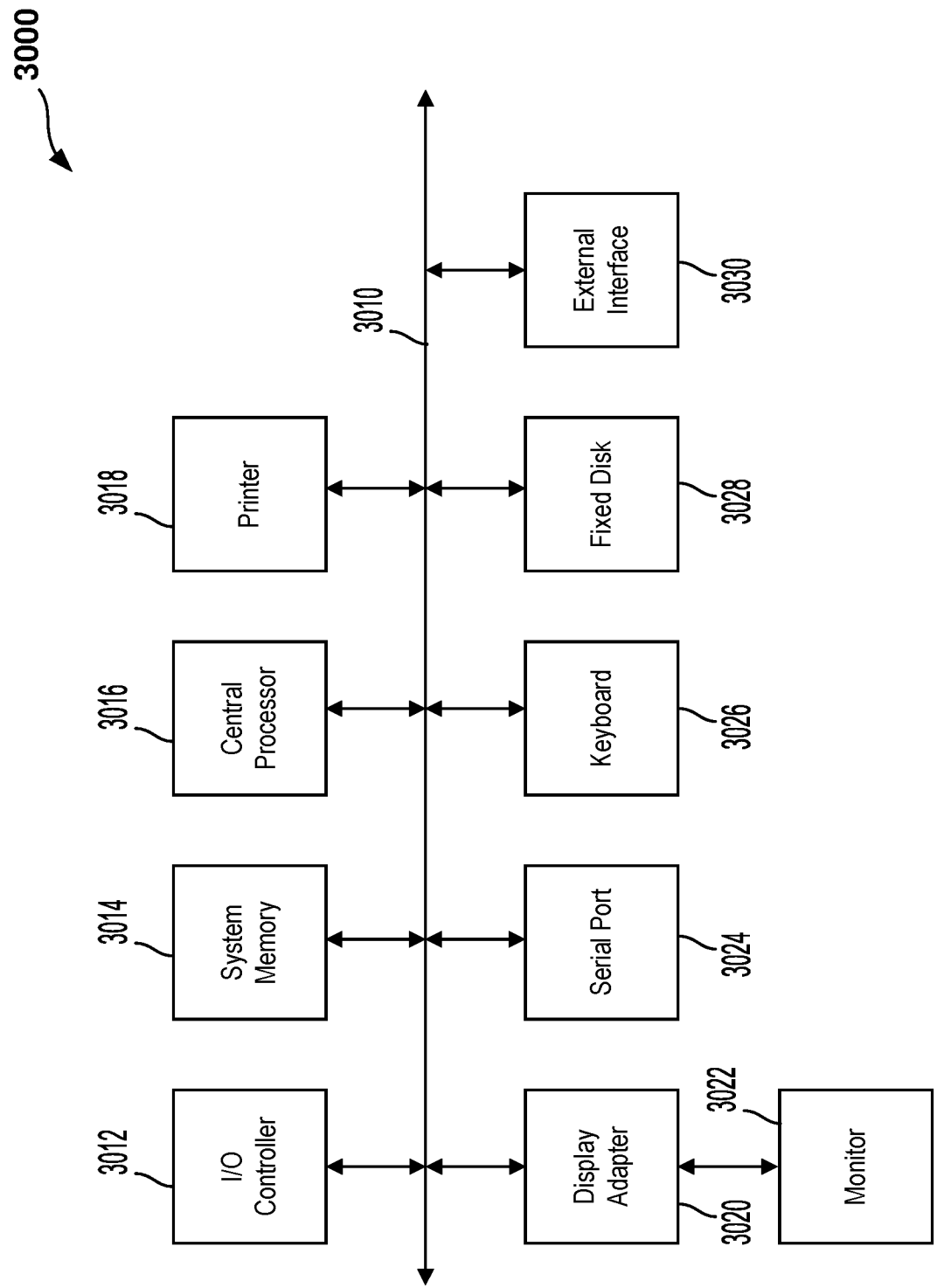
FIG. 4 presents a block diagram of a computer apparatus, according to at least aspect of the present disclosure.

FIG. 4 is a block diagram of a computer apparatus 3000 with data processing subsystems or components, which a set of instructions to perform any one or more of the methodologies discussed herein may be executed, according to at least one aspect of the present disclosure. The subsystems shown in FIG. 4 are interconnected via a system bus 3010. Additional subsystems such as a printer 3018, keyboard 3026, fixed disk 3028 (or other memory comprising computer readable media), monitor 3022, which is coupled to a display adapter 3020, and others are shown. Peripherals and input/output (I/O) devices, which couple to an I/O controller 3012 (which can be a processor or other suitable controller), can be connected to the computer system by any number of means known in the art, such as a serial port 3024. For example, the serial port 3024 or external interface 3030 can be used to connect the computer apparatus to a wide area network such as the Internet, a mouse input device, or a scanner. The interconnection via system bus allows the central processor 3016 to communicate with each subsystem and to control the execution of instructions from system memory 3014 or the fixed disk 3028, as well as the exchange of information between subsystems. The system memory 3014 and/or the fixed disk 3028 may embody a computer readable medium.

Figure 5:
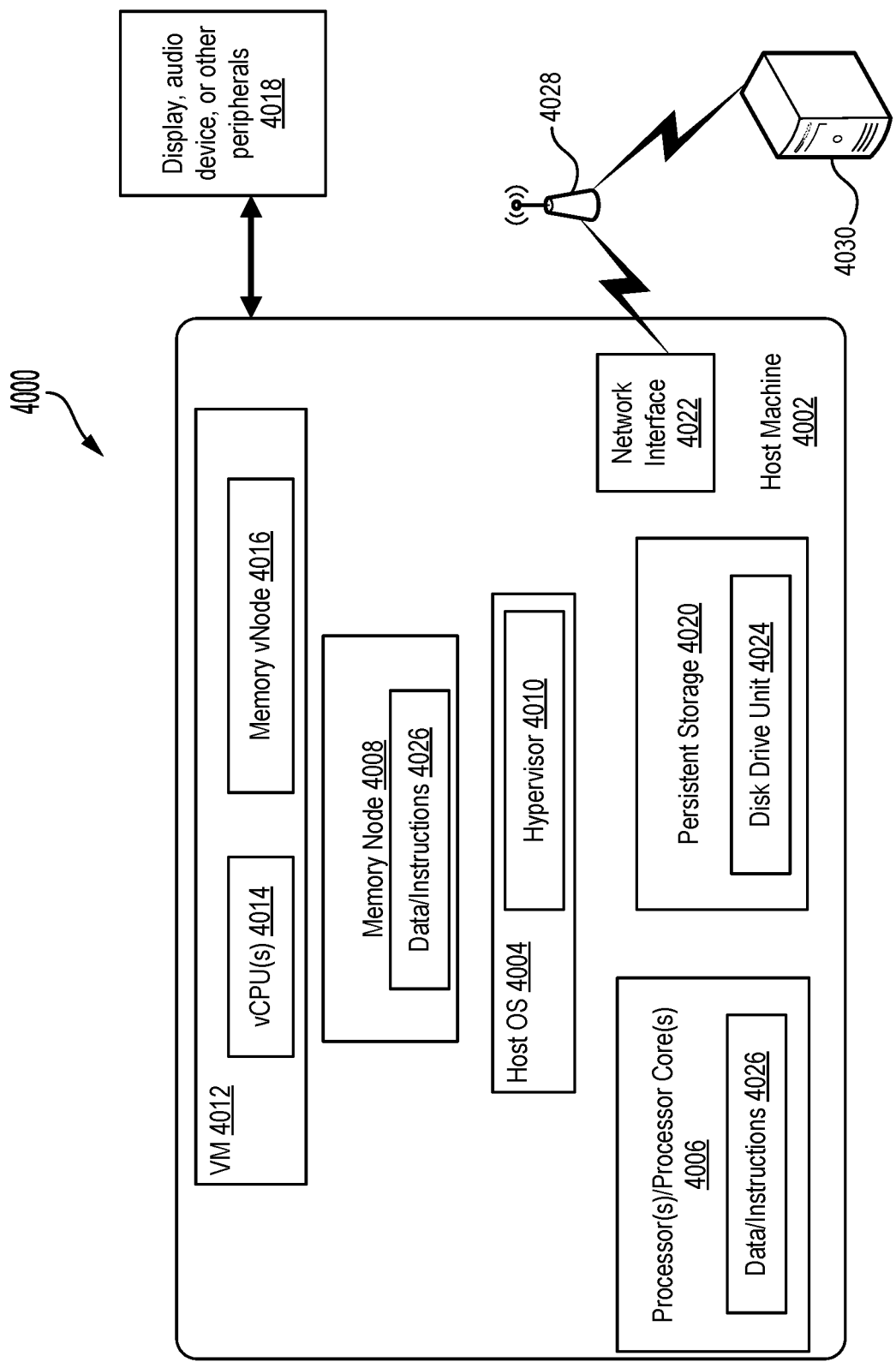
FIG. 5 is a diagrammatic representation of an example system that includes a host machine within which a set of instructions to perform any one or more of the methodologies discussed herein may be executed.

FIG. 5 is a diagrammatic representation of an example system 4000 that includes a host machine 4002 within which a set of instructions to perform any one or more of the methodologies discussed herein may be executed, according to at least one aspect of the present disclosure. In various aspects, the host machine 4002 operates as a standalone device or may be connected (e.g., networked) to other machines. In a networked deployment, the host machine 4002 may operate in the capacity of a server or a client machine in a server-client network environment, or as a peer machine in a peer-to-peer (or distributed) network environment. The host machine 3002 may be a computer or computing device, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example system 4000 includes the host machine 4002, running a host operating system (OS) 4004 on a processor or multiple processor(s)/processor core(s) 4006 (e.g., a central processing unit (CPU), a graphics processing unit (GPU), or both), and various memory nodes 4008. The host OS 4004 may include a hypervisor 4010 which is able to control the functions and/or communicate with a virtual machine ("VM") 4012 running on machine readable media. The VM 4012 also may include a virtual CPU or vCPU 4014. The memory nodes 4008 may be linked or pinned to virtual memory nodes or vNodes 4016. When the memory node 4008 is linked or pinned to a corresponding vNode 4016, then data may be mapped directly from the memory nodes 4008 to their corresponding vNodes 4016.

All the various components shown in host machine 4002 may be connected with and to each other, or communicate to each other via a bus (not shown) or via other coupling or communication channels or mechanisms. The host machine 4002 may further include a video display, audio device or other peripherals 4018 (e.g., a liquid crystal display (LCD), alpha-numeric input device(s) including, e.g., a keyboard, a cursor control device, e.g., a mouse, a voice recognition or biometric verification unit, an external drive, a signal generation device, e.g., a speaker,) a persistent storage device 4020 (also referred to as disk drive unit), and a network interface device 4022. The host machine 4002 may further include a data encryption module (not shown) to encrypt data. The components provided in the host machine 4002 are those typically found in computer systems that may be suitable for use with aspects of the present disclosure and are intended to represent a broad category of such computer components that are known in the art. Thus, the system 4000 can be a server, minicomputer, mainframe computer, or any other computer system. The computer may also include different bus configurations, networked platforms, multi-processor platforms, and the like. Various operating systems may be used including UNIX, LINUX, WINDOWS, QNX ANDROID, IOS, CHROME, TIZEN, and other suitable operating systems.

The disk drive unit 4024 also may be a Solid-state Drive (SSD), a hard disk drive (HDD) or other includes a computer or machine-readable medium on which is stored one or more sets of instructions and data structures (e.g., data/instructions 4026) embodying or utilizing any one or more of the methodologies or functions described herein. The data/instructions 4026 also may reside, completely or at least partially, within the main memory node 4008 and/or within the processor(s) 4006 during execution thereof by the host machine 4002. The data/instructions 4026 may further be transmitted or received over a network 4028 via the network interface device 4022 utilizing any one of several well-known transfer protocols (e.g., Hyper Text Transfer Protocol (HTTP)).

The processor(s) 4006 and memory nodes 4008 also may comprise machine-readable media. The term "computer-readable medium" or "machine-readable medium" should be taken to include a single medium or multiple medium (e.g., a centralized or distributed database and/or associated caches and servers) that store the one or more sets of instructions. The term "computer-readable medium" shall also be taken to include any medium that is capable of storing, encoding, or carrying a set of instructions for execution by the host machine 4002 and that causes the host machine 4002 to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example aspects described herein may be implemented in an operating environment comprising software installed on a computer, in hardware, or in a combination of software and hardware.

One skilled in the art will recognize that Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized to implement any of the various aspects of the disclosure as described herein.

The computer program instructions also may be loaded onto a computer, a server, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 4030 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the host machine 4002, with each server 4030 (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one aspect of a bus. Transmission media can also take the form of acoustic or light waves, such as those generated during radio frequency (RF) and infrared (IR) data communications. Common forms of computer-readable media include, for example, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASH EPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++, or the like and conventional procedural programming languages, such as the "C" programming language, Go, Python, or other programming languages, including assembly languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Examples of the method according to various aspects of the present disclosure are provided below in the following numbered clauses. An aspect of the method may include any one or more than one, and any combination of, the numbered clauses described below.

The foregoing detailed description has set forth various forms of the systems and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

Any of the software components or functions described in this application, may be implemented as software code to be executed by a processor using any suitable computer language such as, for example, Python, Java, C++ or Perl using, for example, conventional or object-oriented techniques. The software code may be stored as a series of instructions, or commands on a computer readable medium, such as RAM, ROM, a magnetic medium such as a hard-drive or a floppy disk, or an optical medium such as a CD-ROM. Any such computer readable medium may reside on or within a single computational apparatus, and may be present on or within different computational apparatuses within a system or network.

As used in any aspect herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

As used in any aspect herein, the terms "component," "system," "module" and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

A network may include a packet switched network. The communication devices may be capable of communicating with each other using a selected packet switched network communications protocol. One example communications protocol may include an Ethernet communications protocol which may be capable of permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in December, 2008 and/or later versions of this standard. Alternatively or additionally, the communication devices may be capable of communicating with each other using an X.25 communications protocol. The X.25 communications protocol may comply or be compatible with a standard promulgated by the International Telecommunication Union-Telecommunication Standardization Sector (ITU-T). Alternatively or additionally, the communication devices may be capable of communicating with each other using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, the transceivers may be capable of communicating with each other using an Asynchronous Transfer Mode (ATM) communications protocol. The ATM communications protocol may comply or be compatible with an ATM standard published by the ATM Forum titled "ATM-MPLS Network Interworking 2.0" published August 2001, and/or later versions of this standard. Of course, different and/or after-developed connection-oriented network communication protocols are equally contemplated herein.

Unless specifically stated otherwise as apparent from the foregoing disclosure, it is appreciated that, throughout the present disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A. B. and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect." "an aspect," "an exemplification." "one exemplification," and the like means that a particular feature, structure, or characteristic described in connection with the aspect is included in at least one aspect. Thus, appearances of the phrases "in one aspect." "in an aspect." "in an exemplification," and "in one exemplification" in various places throughout the specification are not necessarily all referring to the same aspect. Furthermore, the particular features, structures or characteristics may be combined in any suitable manner in one or more aspects.

As used herein, the term "comprising" is not intended to be limiting, but may be a transitional term synonymous with "including," "containing," or "characterized by." The term "comprising" may thereby be inclusive or open-ended and does not exclude additional, unrecited elements or method steps when used in a claim. For instance, in describing a method, "comprising" indicates that the claim is open-ended and allows for additional steps. In describing a device, "comprising" may mean that a named element(s) may be essential for an embodiment or aspect, but other elements may be added and still form a construct within the scope of a claim. In contrast, the transitional phrase "consisting of" excludes any element, step, or ingredient not specified in a claim. This is consistent with the use of the term throughout the specification.

As used herein, the singular form of "a", "an", and "the" include the plural references unless the context clearly dictates otherwise.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material. None is admitted to be prior art.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. A system, comprising:
   at least one node comprising an application container;
   a container image associated with the application container;
   a static analyzer module deployed to analyze the container image, with instructions configured to autonomously:

parse, code of an application, during compile time of the application, wherein the application is to be deployed in the application container;

determine, based on the parsing, for at least one section of the code, at least one module necessary for execution of the at least one section;

annotate, the at least one section of the code, based on the determined at least one module; and inject, at least one wrapper around the at least one section of the code, wherein the wrapper adds at least one restriction to an execution of the at least one section at runtime, wherein the at least one restriction is based on at least one condition.

2. The system of claim 1, wherein the instructions are further configured to:

determine, for the at least one module, at least one operating system module necessary for execution of the module.

3. The system of claim 2, wherein the instructions are further configured to:

determine, a condition where the at least one module, accesses, calls, utilizes, or requires the at least one operating system module, wherein the condition can be based on at least one of a time, state, or user permissions.

4. The system of claim 1, wherein the container image comprises at least one of a base OS layer, an application layer, or a SHIM layer.

5. The system of claim 4, wherein the SHIM layer is placed between the base OS layer and the application layer to manage access to an operating system module.

6. The system of claim 4, wherein the SHIM layer implements the at least one restriction at runtime.

7. The system of claim 4, wherein the SHIM layer is further configured to:

based on the at least one condition being satisfied, undertake at least one of allow access, allow partial access, prevent access, or delay access to an operating system module in the base OS layer by the module in the application layer based on the at least one restriction.

8. The system of claim 4, wherein the base OS layer is a limited version OS layer.

9. The system of claim 1, wherein the at least one restriction is enforced based on the at least one condition.

10. The system of claim 9, wherein the enforcement comprises at least one of preventing execution of the at least one section, delaying execution of the at least one section, or preventing access to an operating system module.

11. The system of claim 1, wherein the at least one restriction is removed based on the at least one condition.

12. A method, comprising:

parsing, code of an application, during compile time of the application, wherein the application is to be deployed in an application container;

determining, based on the parsing, for at least one section of the code, at least one module necessary for execution of the at least one section;

annotating, the at least one section of the code, based on the determined at least one module; and injecting, at least one wrapper around the at least one section of the code, wherein the wrapper adds at least one restriction to an execution of the at least one section at runtime, wherein the restrictions are based on at least one condition.

13. The method of claim 12, further comprising:

determining, for the at least one module, at least one operating system module necessary for execution of the module.

14. The method of claim 13, further comprising:

generating a SHIM layer to enforce the at least one restriction, wherein the at least one restriction comprises preventing the at least one module from at least one of calling, utilizing, or accessing the at least one operating system module.

15. The method of claim 12, further comprising:

generating a SHIM layer to manage the at least one restriction at runtime of the application; and placing the SHIM layer between an application layer and a base OS layer of a container image of the application container.

16. The method of claim 12, wherein the application container is associated to a container image comprising at least one of a base OS layer, an application layer, or a SHIM layer.

17. The method of claim 12, wherein a SHIM layer is placed between a base OS layer and an application layer, to manage access to an at least one operating system module, in the base OS layer, based on the at least one restriction.

18. The method of claim 17, further comprising:

based on the at least one condition being satisfied, undertaking at least one of allow access, allow partial access, prevent access, or delay access to the operating system module in the base OS layer by the module in the application layer based on the at least one restriction.

19. The method of claim 18, wherein a SHIM layer undertakes the at least one of allow access, allow partial access, prevent access, or delay access to the operating system module in the base OS layer by the module in the application layer based on the at least one restriction.

20. A non-transitory machine readable medium storing code, which when executed by a processor is configured to:

parse, code of an application, during compile time of the application, wherein the application is to be deployed in an application container;

determine, based on the parsing, for at least one section of the code, at least one module necessary for execution of the at least one section;

determine, for the at least one module, at least one operating system module necessary for execution of the module;

annotate, the at least one section of the code, based on the determined at least one module; and inject, at least one wrapper around the at least one section of the code, wherein the wrapper adds at least one restriction to an execution of the at least one section at runtime, wherein the restrictions are based on at least one condition.

* * * * *